US012673546B2

(12) United States Patent
Arakawa et al.

(10) Patent No.: US 12,673,546 B2
(45) Date of Patent: Jul. 7, 2026

(54) TRANSMISSION UNIT AND POWER SYSTEM

(71) Applicants: OKAMURA CORPORATION, Yokohama (JP); KUBOTA CORPORATION, Osaka (JP)

(72) Inventors: Jirou Arakawa, Yokohama (JP); Koichi Funaki, Osaka (JP)

(73) Assignees: OKAMURA CORPORATION, Yokohama (JP); KUBOTA CORPORATION, Osaka (JP)

( * ) Notice: Subject to any disclaimer, the term of this patent is extended or adjusted under 35 U.S.C. 154(b) by 125 days.

(21) Appl. No.: 18/033,744

(22) PCT Filed: Dec. 3, 2021

(86) PCT No.: PCT/JP2021/044478
§ 371 (c)(1),
(2) Date: Apr. 25, 2023

(87) PCT Pub. No.: WO2022/131024
PCT Pub. Date: Jun. 23, 2022

(65) Prior Publication Data
US 2023/0398853 A1 Dec. 14, 2023

(30) Foreign Application Priority Data

Dec. 18, 2020 (JP) ................................. 2020-210699

(51) Int. Cl.
*B60K 6/48* (2007.10)
*B60K 6/36* (2007.10)
(Continued)

(52) U.S. Cl.
CPC .................. *B60K 6/48* (2013.01); *B60K 6/36* (2013.01); *B60K 6/387* (2013.01); *B60K 6/40* (2013.01);
(Continued)

(58) Field of Classification Search
CPC ... B60K 6/48; B60K 6/36; B60K 6/40; B60K 6/405; B60K 2006/4833;
(Continued)

(56) References Cited

U.S. PATENT DOCUMENTS 7,681,676 B2 * 3/2010 Kydd ....................... B60K 6/48
180/65.21
10,220,831 B2 * 3/2019 Colavincenzo ......... B60L 50/15
(Continued)

FOREIGN PATENT DOCUMENTS

DE 102015113318 A1 * 2/2016 ............... B60K 6/26
DE 10-2016-212994 A1 1/2018
(Continued)

OTHER PUBLICATIONS

International Search Report for Application No. PCT/JP2021/044478, mailed Feb. 15, 2022 (4 pages).
(Continued)

*Primary Examiner* — Hung Q Nguyen
(74) *Attorney, Agent, or Firm* — NIXON PEABODY LLP; Jeffrey L. Costellia

(57) ABSTRACT

A clutch unit (20) includes a coupling element (23) configured to, in a power transmission enabled manner, couple an output shaft (13) of an engine (10) and an input shaft (16) of a hydraulic pump (15) driven by driving force of the engine (10), and a motor generator (18) configured to generate driving force separately from the engine (10), in which the motor generator (18) is disposed to avoid the coupling element (23) as viewed from an axial direction of the output shaft (13).

12 Claims, 8 Drawing Sheets

<div style="display:flex">
<div>

(51) Int. Cl.

| | |
|---|---|
| *B60K 6/387* | (2007.10) |
| *B60K 6/40* | (2007.10) |
| *F16H 57/02* | (2012.01) |

(52) U.S. Cl.
CPC . *B60Y 2200/92* (2013.01); *F16H 2057/02034* (2013.01); *F16H 2057/02043* (2013.01)

(58) Field of Classification Search
CPC . F16H 2057/02034; F16H 2057/02043; F16H 1/20; F16H 57/031; F16H 57/02; B60W 2300/121; F02B 63/04
See application file for complete search history.

(56) References Cited

U.S. PATENT DOCUMENTS

| | | | | |
|---|---|---|---|---|
| 10,239,516 | B2 * | 3/2019 | Colavincenzo | B60L 50/15 |
| 2006/0247086 | A1 * | 11/2006 | Watanabe | B60K 6/387 |
| | | | | 475/5 |
| 2010/0065358 | A1 * | 3/2010 | Harris | B60W 10/10 |
| | | | | 180/65.265 |
| 2011/0294620 | A1 * | 12/2011 | Pruitt | B60W 10/02 |
| | | | | 903/930 |

</div>
<div>

| | | | | |
|---|---|---|---|---|
| 2018/0118012 | A1 | 5/2018 | Wilton et al. | |
| 2018/0162213 | A1 * | 6/2018 | Colavincenzo | B60L 50/15 |
| 2018/0162376 | A1 * | 6/2018 | Colavincenzo | B60L 3/12 |

FOREIGN PATENT DOCUMENTS

| | | | | |
|---|---|---|---|---|
| DE | 102016219380 A1 | 4/2018 | | |
| EP | 2468553 A1 * | 6/2012 | | B60K 6/48 |
| FR | 3080068 A1 | 10/2019 | | |
| JP | 2010-533620 | 10/2010 | | |
| JP | 2014-133455 | 7/2014 | | |
| JP | 2015-182512 | 10/2015 | | |
| JP | 2020-093638 | 6/2020 | | |
| JP | 2020-093639 | 6/2020 | | |
| WO | WO-2009/010819 | 1/2009 | | |
| WO | WO-2010043361 A1 * | 4/2010 | | B60K 6/26 |

OTHER PUBLICATIONS

Extended European Search Report (Application No. 21906387.2) mailed Oct. 28, 2024. pp.7.

Office Action in European Patent Application No. EP21906387.2-1009, dated Jul. 18, 2025, (4 pages).

Chinese Office Action in Chinese Patent Application No. 202180072589.4 dated Feb. 26, 2026, with English Translation of Search Report (9 pages).

* cited by examiner

</div>
</div>

FIG. 4

TRANSMISSION UNIT AND POWER SYSTEM

TECHNICAL FIELD

The present invention relates to a transmission unit and a power system.

Priority is claimed on Japanese Patent Application No. 2020-210699 filed Dec. 18, 2020, the content of which is incorporated herein by reference.

BACKGROUND ART

For example, Patent Documents 1 and 2 disclose a technique in which, in a driving system of a hybrid vehicle, a hydraulic clutch 14 is provided between an engine 10 and a motor 15, the connection or disconnection of the clutch 14 is controlled to smoothly switch between an engine traveling mode and an EV traveling mode.

CITATION LIST

Patent Documents

[Patent Document 1]
Japanese Unexamined Patent Application, First Publication
    No. 2020-093638
[Patent Document 2]
Japanese Unexamined Patent Application, First Publication
    No. 2020-093639

SUMMARY OF INVENTION

Technical Problem

In the related art described above, there is no disclosure of retrofitting a second driving source, such as a motor, to a first driving source, such as an engine. However, in a case in which the second driving source can be retrofitted to the existing first driving source to achieve hybridization, a highly versatile power system can be configured.

The present invention provides a transmission unit and a power system that can efficiently install a second driving source in a first driving source and achieve hybridization.

Solution to Problem

A first aspect of the present invention relates to a transmission unit including a coupling element configured to, in a power transmission enabled manner, couple an output shaft of a driving source and an input shaft of a driven device driven by driving force of the driving source, and a second driving source configured to generate driving force separately from the driving source, in which the second driving source is disposed to avoid the coupling element as viewed from an axial direction of the output shaft.

In a second aspect of the present invention, according to the first aspect, the second driving source is a motor generator and includes a second output shaft that is offset with respect to the output shaft, and a transmission mechanism configured to accelerate driving force of the output shaft and transmit the accelerated driving force to the second output shaft is provided between the output shaft and the second output shaft.

In a third aspect of the present invention, according to the second aspect, between the output shaft and the second output shaft, the transmission mechanism configured to transmit power is provided, and a transmission case configured to accommodate the transmission mechanism is also provided, a rotor housing configured to accommodate a rotor configured to rotate integrally with the output shaft is provided in a portion on a driving source side of the transmission case, and the second driving source is disposed to avoid the rotor housing at the portion on the driving source side of the transmission case.

In a fourth aspect of the present invention, according to the third aspect, the transmission case includes a flat-shaped case portion that is formed into a flat shape with a width in the axial direction narrower than a width in an orthogonal direction, which is orthogonal to the axial direction, and that is disposed between the driving source and the driven device in the axial direction.

In a fifth aspect of the present invention, according to the fourth aspect, the rotor housing and the second driving source are disposed at a portion on a driving source side of the flat-shaped case portion.

In a sixth aspect of the present invention, according to any one of the second to fifth aspects, the coupling element includes a clutch configured to connect or disconnect power transmission between the driving source and the driven device, the second driving source is the motor generator and is coupled to the driving source via the clutch in a power transmission enabled manner, and the second driving source is coupled to the driven device without passing through the clutch in a power transmission enabled manner.

A seventh aspect of the present invention relates to a power system including the transmission unit according to any one of the first to sixth aspects, the driving source, and the driven device.

Advantageous Effects of Invention

According to the first and seventh aspects of the present invention, the second driving source is disposed to be offset from the coupling element of the driving source and the driven device, so that it is possible to further suppress the increase in widths of the transmission unit and the power system including the transmission unit in the axial direction as compared with a case in which the second driving source is disposed coaxially with the driving source.

In addition, as compared with a case in which the second driving source is interposed between the output shaft of the driving source and the input shaft of the driven device, it is easier to access the second driving source from the outside and it is possible to further improve the maintainability.

According to the second aspect of the present invention, since the driving force of the driving source can be accelerated and transmitted to the second driving source, it is possible to increase a power generation amount of the motor generator.

In addition, since the driving force of the motor generator is decelerated and transmitted to the driving source and the driven device, it is possible to suppress the output of the motor generator.

Therefore, it is possible to reduce the size and weight of the motor generator.

According to the third aspect of the present invention, it is possible to efficiently dispose the rotor housing and the second driving source at the portion on the driving source side of the transmission case, and it is possible to reduce the size of the transmission unit.

According to the fourth aspect of the present invention, the transmission case includes the flat-shaped case portion having a flat shape with a suppressed width in the axial direction and disposed between the driving source and the driven device, so that it is possible to dispose the transmission unit without a large separation between the driving source and the driven device.

According to the fifth aspect of the present invention, since the rotor housing and the second driving source are disposed together at the portion on the driving source side of the flat-shaped case portion, it is possible to make the transmission unit more compact as compared with a case in which the rotor housing and the second driving source are disposed to be distributed on both sides of the flat-shaped case portion in the axial direction.

According to the sixth aspect of the present invention, in a case in which the clutch is in a connected state, the driven device can be driven by the driving source, and the motor generator can also be driven to generate power. In this case, in a case in which a powering operation of the motor generator is performed, the motor generator can assist the driving of the driving source.

In addition, in a case in which the powering operation of the motor generator is performed with the clutch which is in a disconnected state, the driven device can be driven only by the motor generator while the driving source is stopped.

BRIEF DESCRIPTION OF DRAWINGS

FIG. 4 is a perspective view of the transmission unit as viewed from an engine side.

DESCRIPTION OF EMBODIMENTS

Hereinafter, a first embodiment of the present invention will be described with reference to drawings.
<Power System>

Figure 1:
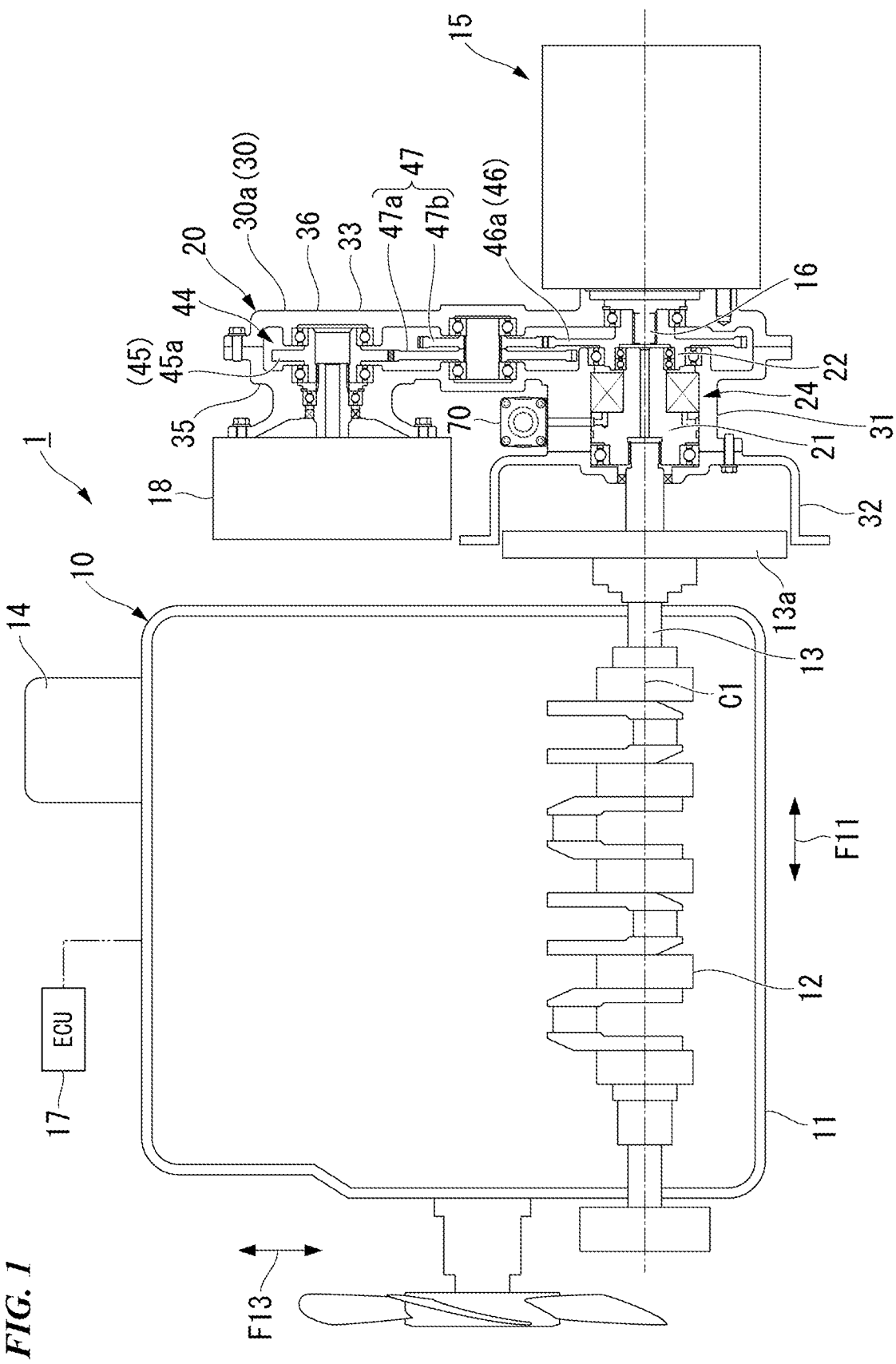
FIG. 1 is an explanatory view including a cross section of a power system in one embodiment of the present invention.
Figure 2:
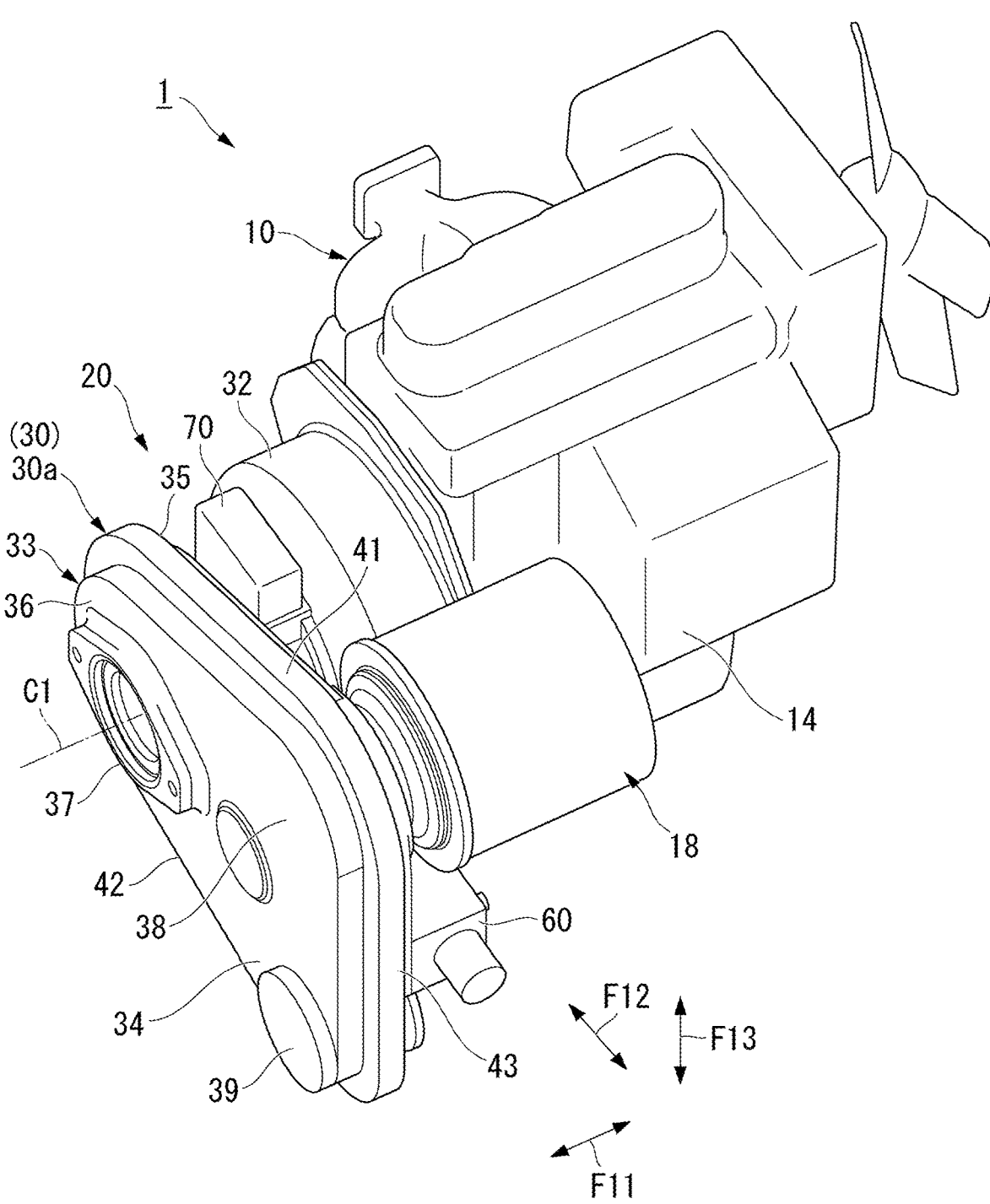
FIG. 2 is a perspective view of the power system.

As shown in FIGS. 1 and 2, the power system 1 according to the present embodiment includes an engine 10 (driving source), a hydraulic pump 15 (driven device), and a clutch unit 20 (transmission unit).

The engine 10 is an in-line four-cylinder type internal combustion engine, for example. The engine 10 accommodates a crankshaft 12 (driving shaft) in a crankcase 11. The engine 10 includes, for example, an output shaft 13 coaxial with the crankshaft 12 protruding outside the crankcase 11. The output shaft 13 outputs rotational driving force with the operation of the engine 10.

The hydraulic pump 15 is connected to the output shaft 13 via a hydraulic clutch 24 (transmission device) provided in the clutch unit 20. The hydraulic pump 15 is driven by receiving input of rotational power from at least one of the engine 10 and a motor generator 18 (described below). The hydraulic pump 15 is driven to generate a hydraulic pressure to be supplied to the outside. The hydraulic pressure generated by the hydraulic pump 15 is supplied to, for example, a hydraulic actuator of a construction machine or an industrial machine.

The hydraulic clutch 24 is in a connected state by the supply of the hydraulic pressure, and enables transmission of rotational driving force between the output shaft 13 of the engine 10 and an input portion 16 (input shaft) of the hydraulic pump 15. Hereinafter, the output shaft 13 may be referred to as an engine output shaft 13, the input portion 16 may be referred to as an input shaft 16, and the hydraulic clutch 24 may be referred to as a clutch 24.

A line C1 in the drawing indicates a rotation center axis of the output shaft 13 and the input portion 16 which are coaxial with each other. The power system 1 is mounted on the vehicle with an axial direction of the output shaft 13 (direction along the axis C1, a direction of an arrow F11 in the drawing) which is horizontal. An arrow F12 in the drawing indicates a width direction orthogonal to the axial direction F11 and horizontal at the time of vehicle mounting, and an arrow F13 in the drawing indicates an up-down direction orthogonal to the axial direction F11 and the width direction and vertical at the time of vehicle mounting.

The power system 1 is mounted, for example, on a special vehicle, such as a construction machine such as a hydraulic excavator, or an industrial machine such as a forklift. These mounting vehicles are equipped with a hydraulic actuator, such as a hydraulic cylinder, a hydraulic motor, or the like. The power system 1 generates the hydraulic pressure to be supplied to the hydraulic actuator of the mounting vehicle.

The clutch unit 20 is disposed between the output shaft 13 of the engine 10 and the input portion 16 of the hydraulic pump 15. The clutch unit 20 is smaller than the engine 10 and is easily replaced and mounted on a different engine 10. The input portion 16 of the hydraulic pump 15 is a rotating element disposed coaxially with the output shaft 13 of the engine 10. The clutch unit 20 includes the clutch 24 that connects or disconnects power transmission between the output shaft 13 of the engine 10 and the input portion 16 of the hydraulic pump 15. The clutch 24 switches availability of the power transmission between the output shaft 13 of the engine 10 and the input portion 16 of the hydraulic pump 15.

The clutch unit 20 includes a transmission case 30 that accommodates the clutch 24 and the like. The transmission case 30 is disposed between the engine 10 and the hydraulic pump 15 in the axial direction F11 of the output shaft 13.

Figure 3:
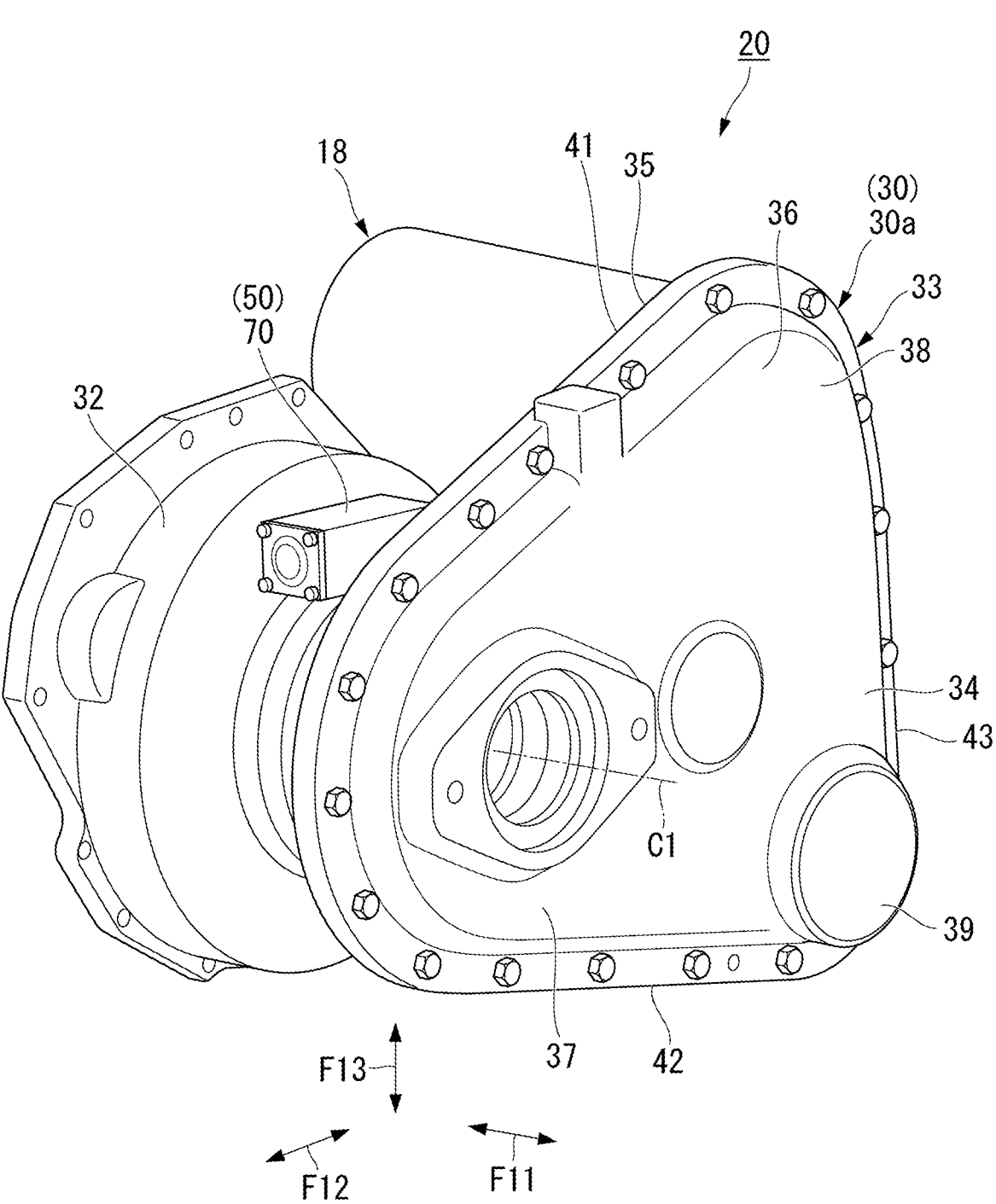
FIG. 3 is a perspective view of a transmission unit disposed between an engine and a hydraulic pump of the power system, as viewed from a hydraulic pump side.
Figure 4:
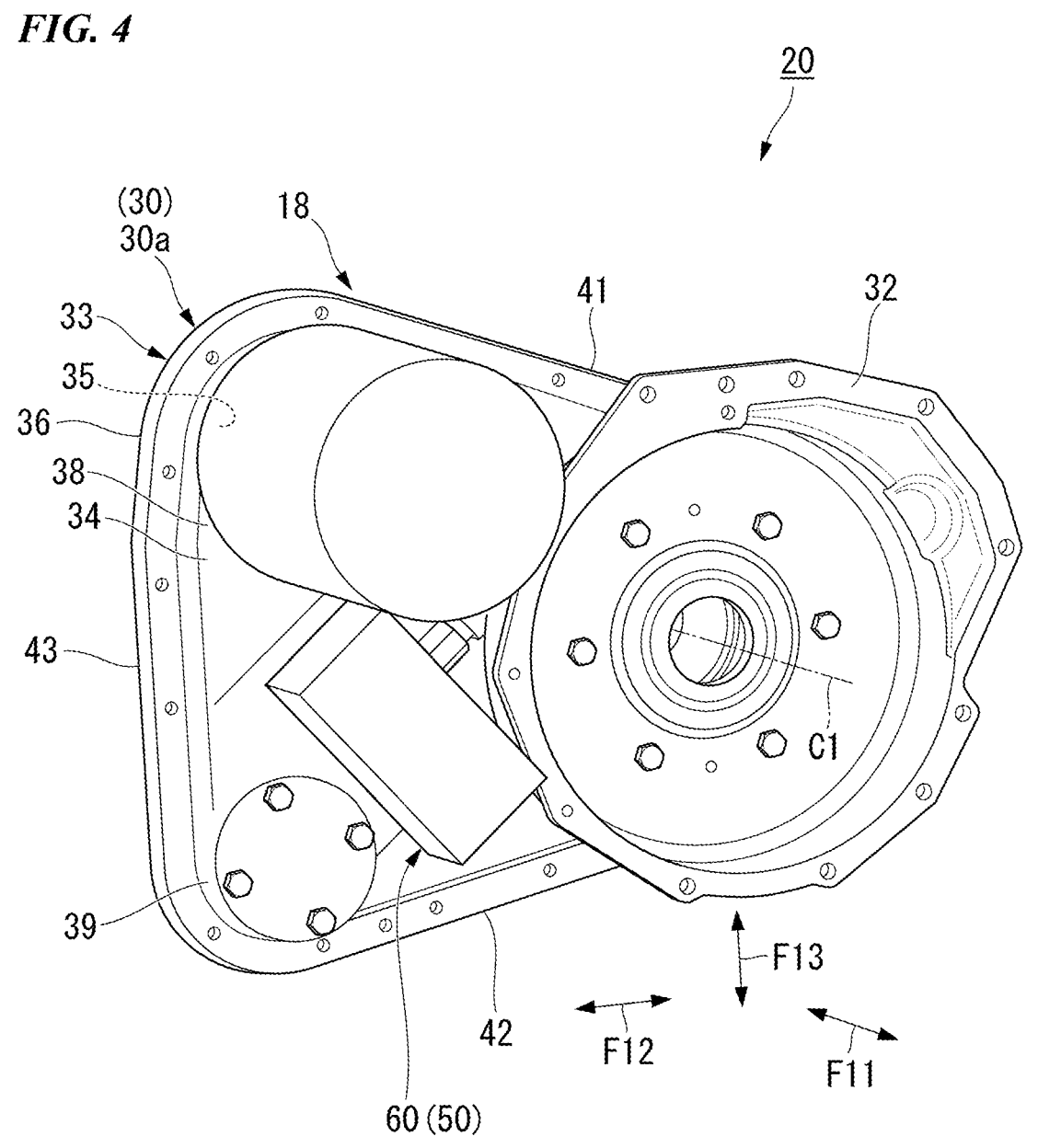
Figure 5:
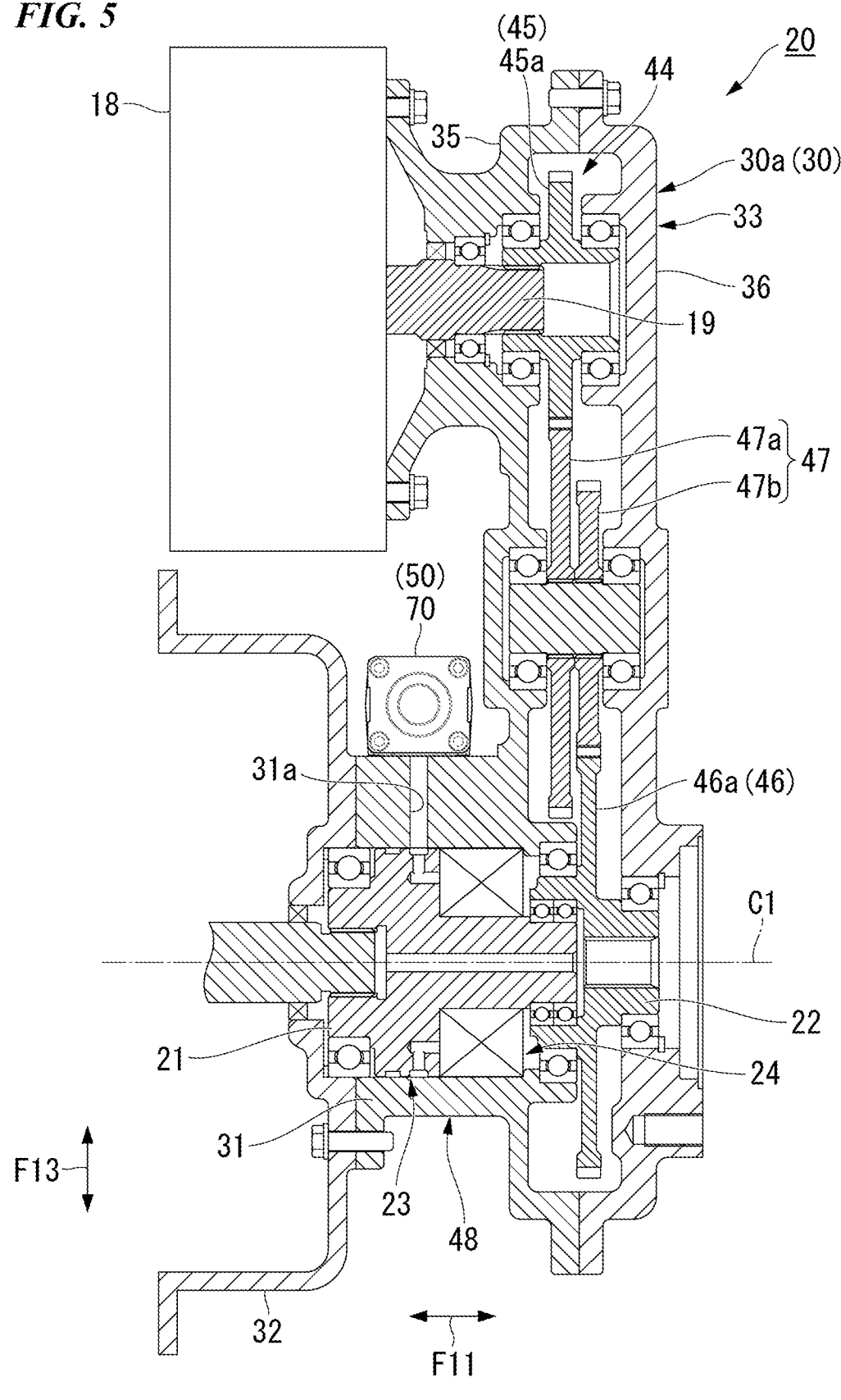
FIG. 5 is a cross-sectional view of the transmission unit.

With reference to FIGS. 3 to 5, the transmission case 30 includes a cylindrical-shaped case portion 31 that has a cylindrical shape and accommodates the output shaft 13 of the engine 10 and the rotating element coaxial with the output shaft 13, a wheel housing 32 that has a larger diameter than the cylindrical-shaped case portion 31, is disposed on the engine 10 side of the cylindrical-shaped case portion 31, and accommodates a flywheel 13a provided in the output shaft 13, and a flat-shaped case portion 33 that is disposed on the hydraulic pump 15 side of the cylindrical-shaped case portion 31 and has a flat shape with a width in the axial direction F11 narrower than each width in the width direction F12 and the up-down direction F13.

The flat-shaped case portion 33 extends toward one side in the width direction while increasing the width thereof in the up-down direction as viewed from the axial direction F11. The flat-shaped case portion 33 has a substantially triangular shape as viewed from the axial direction F11. A portion on one side in the width direction of the flat-shaped case portion 33 protrudes to one side in the width direction with respect to the wheel housing 32 as viewed from the axial direction. The protruding portion is referred to as a protruding portion 34. In addition, a side surface of the flat-shaped case portion 33 facing the engine 10 side in the axial direction is referred to as a first side surface 35, and a side surface of the flat-shaped case portion 33 facing the hydraulic pump 15 side in the axial direction is referred to as a second side surface 36. For example, the first side surface 35 and the second side surface 36 have a planar shape and are orthogonal to the axial direction.

At least part of the wheel housing 32 (entirety in the present embodiment) is disposed on the engine 10 side of the flat-shaped case portion 33 (engine 10 side with respect to the first side surface 35) in the axial direction F11. At least part of the motor generator (second driving source) 18 (entirety in the present embodiment) is disposed on the engine 10 side of the protruding portion 34 of the flat-shaped case portion 33 (engine 10 side with respect to the first side surface 35) in the axial direction F11. A hydraulic regulator 60 and an oil passage switching valve 70 of an oil supply control device 50, which will be described below, are further disposed on the engine 10 side of the flat-shaped case portion 33 (engine 10 side with respect to the first side surface 35) in the axial direction F11.

The motor generator 18 is configured as an MR motor, for example. The motor generator 18 is connected to an in-vehicle power source (secondary battery) via an inverter (not shown).

The motor generator 18 functions as an electric motor that generates second driving force separately from the engine 10 according to electric power supplied from the in-vehicle power source. The motor generator 18 functions as a generator that generates electric power according to the power transmission from engine 10. For example, the electric power generated by the motor generator 18 is charged to the in-vehicle power source. The electric power exchanged between the motor generator 18 and the in-vehicle power source is adjusted by the inverter (not shown).

The power system 1 includes a control unit 17 as an electronic control unit (ECU). The control unit 17 includes an arithmetic processing circuit that performs various arithmetic processing related to the driving of the engine 10, and a storage device that stores a control program or data.

Various detection signals are input to the control unit 17. The detection signal includes a rotational speed of the engine 10 (for example, a rotational speed of a crankshaft), various temperatures of the engine 10, an accelerator operation amount (output request amount), a vehicle state, such as a vehicle speed, electric power storage amount of the in-vehicle power source, or the like. Based on these detection signals, the control unit 17 performs an operation control of the power system 1. The operation control includes an operation control of the engine 10, controls of powering and regeneration (power generation) of the motor generator 18, and a control of an electromagnetic valve of the oil supply control device 50.

The motor generator 18 is coupled to the engine 10 via a clutch 24 in a power transmission enabled manner. The motor generator 18 enables the power transmission with the engine 10 when the clutch is connected, and disables the power transmission with the engine 10 when the clutch is disconnected. The motor generator 18 is always coupled to the hydraulic pump 15 in a power transmission enabled manner without passing through the clutch 24.

The power system 1 switches each availability of the power transmission between the engine 10 and the hydraulic pump 15 and between the engine 10 and the motor generator 18, by the connection or disconnection of the clutch 24. When the clutch 24 is in the connected state, each power transmission between engine 10 and hydraulic pump 15 and between engine 10 and motor generator 18 is enabled.

When the clutch 24 is in the disconnected state, each power transmission between engine 10 and hydraulic pump 15 and between engine 10 and motor generator 18 is disabled.

The power system 1 can be operated in the following first, second, and third operation modes by control involving the connection or disconnection of the clutch 24. The clutch unit 20 switches a power transmission path such that the power for driving the hydraulic pump 15 is transmitted from at least one of the engine 10 and the motor generator 18.

In the first operation mode (engine driving mode (charging mode)), the clutch 24 is in the connected state, and the motor generator 18 is driven by driving the engine 10 while the hydraulic pump 15 is driven by driving the engine 10. That is, the engine 10 can drive the hydraulic pump 15 to generate the hydraulic pressure while the engine 10 drives the motor generator 18 to generate the power. As a result, it is possible to cause the vehicle to travel or the like with the output of the hydraulic pump 15 while charging the in-vehicle power source. In addition, in a case in which the kinetic energy of the vehicle can be input from the output shaft 13 to the motor generator 18, the first operation mode is also a regeneration mode in which the kinetic energy of the vehicle is regenerated into electricity.

In the second operation mode (engine+motor driving mode (engine assist mode)), the clutch 24 is in the connected state and the hydraulic pump 15 is driven by driving both the engine 10 and the motor generator 18. That is, it is possible to generate the hydraulic pressure by driving the hydraulic pump 15 with the power of both the engine 10 and the motor. As a result, the driving of the hydraulic pump 15 by the engine 10 can be assisted by the motor generator 18 to obtain high output.

In the third operation mode (motor driving mode), the clutch 24 is in the disconnected state, only the motor generator 18 is driven while the engine 10 is stopped, and the hydraulic pump 15 is driven by driving the motor generator 18. That is, it is possible to generate the hydraulic pressure by driving the hydraulic pump 15 only by driving the motor generator 18 while the engine 10 is stopped. As a result, it is possible to obtain the hydraulic pressure by driving the hydraulic pump 15 using the motor generator 18 in a state in which the engine 10 is stopped.

<Clutch Unit>

As shown in FIGS. 1 to 5, the clutch unit 20 includes the clutch 24 that operates by the supply of the hydraulic pressure, and the oil supply control device 50 that controls the supply of hydraulic oil to the clutch 24.

With reference to FIG. 5, the clutch unit 20 includes a first coupling shaft 21 coupled to the output shaft 13 of the engine 10 in an integrally rotatable manner, and a second coupling shaft 22 coupled to the input portion 16 of the hydraulic pump 15 in an integrally rotatable manner. The first coupling shaft 21 is disposed coaxially with the output shaft 13 of the engine 10 and always rotates integrally with the output shaft 13. The second coupling shaft 22 is disposed coaxially with the input portion 16 of the hydraulic pump 15 and always rotates integrally with the input shaft. The first coupling shaft 21 and the second coupling shaft 22 are disposed coaxially with each other, and the clutch 24 is provided between the first coupling shaft 21 and the second coupling shaft 22. The first coupling shaft 21 and the second coupling shaft 22 are coupled via the clutch 24 such that the power transmission can be connected or disconnected.

The clutch 24 operates by being supplied with the hydraulic pressure from the outside (oil pump 14). The clutch 24 is a normally open type hydraulic clutch. The clutch 24 is in the connected state (state in which the power transmission is enabled between the engine 10 and the hydraulic pump 15) by the supply of the hydraulic pressure from the outside. The clutch 24 is in the disconnected state (state in which the power transmission is disabled between the engine 10 and the hydraulic pump 15) by the disappearance of the supply of the hydraulic pressure from the outside. For example, the clutch 24 is a multi-plate clutch including a plurality of disc-shaped friction plates (clutch plates) coaxial with the output shaft 13.

The oil supply control device 50 controls (regulates) the oil (hydraulic pressure) discharged by the oil pump 14 that operates together with the engine 10 to a regular pressure and outputs the oil. The oil supply control device 50 supplies the regular hydraulic pressure, which is regulated, to the clutch 24 when the clutch is connected. The oil pump 14 is provided integrally with the engine 10. The oil pump 14 is driven as the engine 10 is driven. The oil pump 14 is always driven to operate together with the crankshaft 12 after the engine is started. The engine 10 increases the rotational speed according to an increase in the output request. The oil pump 14 increases a discharge amount according to an increase in the rotational speed of the engine. A flow rate of the oil returned upstream of the oil pump 14 from the oil supply control device 50 increases according to the increase in the rotational speed of the engine.

In a case in which the hydraulic pressure is supplied from the oil supply control device 50 to the clutch 24, the clutch 24 is in the connected state, and the first coupling shaft 21 and the second coupling shaft 22 are coupled in a power transmission enabled manner. When the supply of hydraulic pressure to the clutch 24 is stopped, the clutch 24 is in the disconnected state, and the power transmission enabled coupling between the first coupling shaft 21 and the second coupling shaft 22 is released (that is, the power transmission is disabled).

With reference to FIGS. 3 and 4 together, the flat-shaped case portion 33 of the transmission case 30 extends toward one side in the width direction while increasing the width thereof in the up-down direction as viewed from the axial direction F11. The flat-shaped case portion 33 has a substantially triangular shape as viewed from the axial direction F11. Hereinafter, a shape of the flat-shaped case portion 33 as viewed from the axial direction F11 will be described. In the flat-shaped case portion 33, a first circular portion 37 that has a circular shape centered on the output shaft 13, and a second circular portion 38 and a third circular portion 39 that are vertically arranged at positions separated from the first circular portion 37 toward one side in the width direction are formed. In an outer peripheral portion of the flat-shaped case portion 33, an upper side portion 41 along a tangent line that contacts the first circular portion 37 and the second circular portion 38 from above, a lower side portion 42 along a tangent line that contacts the first circular portion 37 and the third circular portion 39 from below, and a lateral side portion 43 along a tangent line that contacts the second circular portion 38 and the third circular portion 39 from one side in the width direction are formed.

With reference to FIG. 5, the cylindrical-shaped case portion 31 protruding to the engine 10 side with respect to the first side surface 35 is provided on the engine 10 side of the flat-shaped case portion 33 on the other side in the width direction. A clutch fluid, which is clutch hydraulic oil, is stored inside the transmission case 30. The transmission case 30 also serves as an oil tank 30a that stores the clutch fluid.

The motor generator 18 has an output shaft (second output shaft, hereinafter may be referred to as a motor output shaft) 19 parallel to the output shaft 13 of the engine 10. The motor generator 18 generates the second driving force separately from the engine 10. The motor output shaft 19 of the motor generator 18 is offset with respect to the output shaft 13 of the engine 10 in a radial direction. For example, in the shown example, the motor output shaft 19 is offset diagonally upward with respect to the output shaft 13 in the radial direction. The motor output shaft 19 and the motor generator 18 are disposed at positions to avoid the coupling element 23 and the coupling case portion 48, which will be described below, as viewed from the axial direction of each of the output shafts 13 and 19.

A transmission gear train (transmission mechanism) 44 is configured between the motor generator 18 and the hydraulic pump 15. The transmission gear train 44 enables the power transmission between the output shaft 13 of the engine 10 and the motor output shaft 19. The transmission gear train 44 accelerates the rotation of the output shaft 13 of the engine 10 and transmits the accelerated rotation to the motor output shaft 19. The transmission gear train 44 decelerates the rotation of the motor output shaft 19 and transmits the decelerated rotation to the output shaft 13 of the engine 10. The transmission gear train 44 includes a first gear shaft 45 coaxial with the motor output shaft 19, a second gear shaft 46 coaxial with the input portion 16 of the hydraulic pump 15, and a relay gear shaft 47 disposed between the first gear shaft 45 and the second gear shaft 46.

The first gear shaft 45 is provided integrally with a first transmission gear 45a. The second gear shaft 46 is provided integrally with second transmission gear 46a. The relay gear shaft 47 is provided with a first relay gear 47a that meshes with the first transmission gear 45a and a second relay gear 47b that meshes with the second transmission gear 46a in an integrally rotatable manner. The first transmission gear 45a has a smaller diameter than the first relay gear 47a. The second relay gear 47b has a smaller diameter than the second transmission gear 46a.

Therefore, the driving force of the motor generator 18 is decelerated between the first transmission gear 45a and the first relay gear 47a, and is also decelerated between the second relay gear 47b and the second transmission gear 46a and is transmitted to the hydraulic pump 15. When the clutch is connected, the driving force of the engine 10 is accelerated between the second transmission gear 46a and the second relay gear 47b, and is also accelerated between the first relay gear 47a and the first transmission gear 45a, and is transmitted to the motor generator 18.

The coupling element 23 is a rotating element that couples the output shaft 13 of the engine 10 and the input portion 16 of the hydraulic pump 15 in an integrally rotatable manner. The coupling element 23 includes the first and second coupling shafts 21 and 22, and the clutch 24 that connects or disconnects the power transmission between these coupling shafts 21 and 22.

The coupling element 23 is accommodated in the coupling case portion 48. Unlike the coupling element 23, the output shaft 13, and the input portion 16, the coupling case portion 48 is a non-rotating element that does not rotate with respect to main bodies (bodies) of the engine 10 and the hydraulic pump 15. The coupling case portion 48 includes the first circular portion 37, the cylindrical-shaped case portion 31, and the wheel housing 32 of the transmission case.

As described above, the clutch unit 20 having the component disposition structure includes the coupling element 23 that couples, in a power transmission enabled manner, the output shaft 13 of the engine 10 and the input shaft 16 of the hydraulic pump 15 driven by the driving force of the engine 10, and the motor generator 18 that generates the driving force separately from the engine 10, in which the motor generator 18 is disposed to avoid the coupling element 23 as viewed from the axial direction of the output shaft 13.

The power system 1 according to the present embodiment includes the clutch unit 20, the engine 10, and the hydraulic pump 15.

With this configuration, by disposing the motor generator 18 to be offset with respect to the coupling element 23 of the engine 10 and the hydraulic pump 15, it is possible to further suppress an increase in the widths of the transmission unit and the power system including the transmission unit in the axial direction as compared with a case in which the motor generator 18 is disposed coaxially with the engine 10.

In addition, as compared with a case in which the motor generator 18 is interposed between the output shaft 13 of the engine 10 and the input shaft 16 of the hydraulic pump 15, it is easier to access the motor generator 18 from the outside and it is possible to further improve the maintainability.

In the clutch unit 20, the motor generator 18 includes the motor output shaft 19 that is offset with respect to the output shaft 13, and a transmission mechanism 44 that can accelerate the driving force of the output shaft 13 and transmit the accelerated driving force to the motor output shaft 19 is provided between the output shaft 13 and the motor output shaft 19.

With this configuration, the driving force of the engine 10 can be accelerated and transmitted to the motor generator 18, so that the power generation amount of the motor generator 18 can be increased.

In addition, the driving force of the motor generator 18 is decelerated and transmitted to the engine 10 and the hydraulic pump 15, so that the output of the motor generator 18 can be suppressed.

Therefore, it is possible to reduce the size and weight of the motor generator 18.

In the clutch unit 20, between the output shaft 13 and the motor output shaft 19, the transmission mechanism 44 that can transmit the power is provided, and the transmission case 30 that accommodates the transmission mechanism 44 is also provided, the wheel housing 32 that accommodates the flywheel 13a that rotates integrally with the output shaft 13 is provided in the portion on the engine 10 side of the transmission case 30, and the motor generator 18 is disposed to avoid the wheel housing 32 at the portion on the engine 10 side of the transmission case 30.

With this configuration, it is possible to efficiently dispose the wheel housing 32 and the motor generator 18 at the portion on the engine 10 side of the transmission case 30, so that the size of the clutch unit 20 can be reduced.

In the clutch unit 20, the transmission case 30 includes the flat-shaped case portion 33 that is formed into a flat shape with the width in the axial direction F11 narrower than the width in the orthogonal direction (width direction F12 and up-down direction F13) orthogonal to the axial direction F11, and is disposed between the engine 10 and the hydraulic pump 15 in the axial direction F11.

With this configuration, the transmission case 30 includes the flat-shaped case portion 33 that has a flat shape with a suppressed width in the axial direction F11 and is disposed between the engine 10 and the hydraulic pump 15, so that it is possible to dispose the clutch unit 20 without a large separation between the engine 10 and a driven unit while securing the capacity of the oil tank 30a as much as possible.

In the clutch unit 20, the wheel housing 32 and the motor generator 18 are disposed at the portion on the engine 10 side of the flat-shaped case portion 33.

With this configuration, the wheel housing 32 and the motor generator 18 are disposed together at the portion on the engine 10 side of the flat-shaped case portion 33, so that it is possible to make the clutch unit 20 more compact as compared with a case in which the wheel housing 32 and the motor generator 18 are disposed to be distributed on both sides of the flat-shaped case portion 33 in the axial direction.

In the clutch unit 20, the coupling element 23 includes the clutch 24 that connects or disconnects the power transmission between the engine 10 and the hydraulic pump 15, the motor generator 18 is coupled to the engine 10 via the clutch 24 in a power transmission enabled manner, and the motor generator 18 is coupled to the hydraulic pump 15 without passing through the clutch 24 in a power transmission enabled manner.

With this configuration, in a case in which the clutch 24 is in the connected state, the engine 10 can drive the hydraulic pump 15 and drive the motor generator 18 to generate the power.

In this case, in a case in which the powering operation of the motor generator 18 is performed, the motor generator 18 can assist the driving of the engine 10.

In addition, in a case in which the powering operation of the motor generator 18 is performed with the clutch 24 which is in the disconnected state, the hydraulic pump 15 can be driven only by the motor generator 18 while the engine 10 is stopped.

Figure 6:
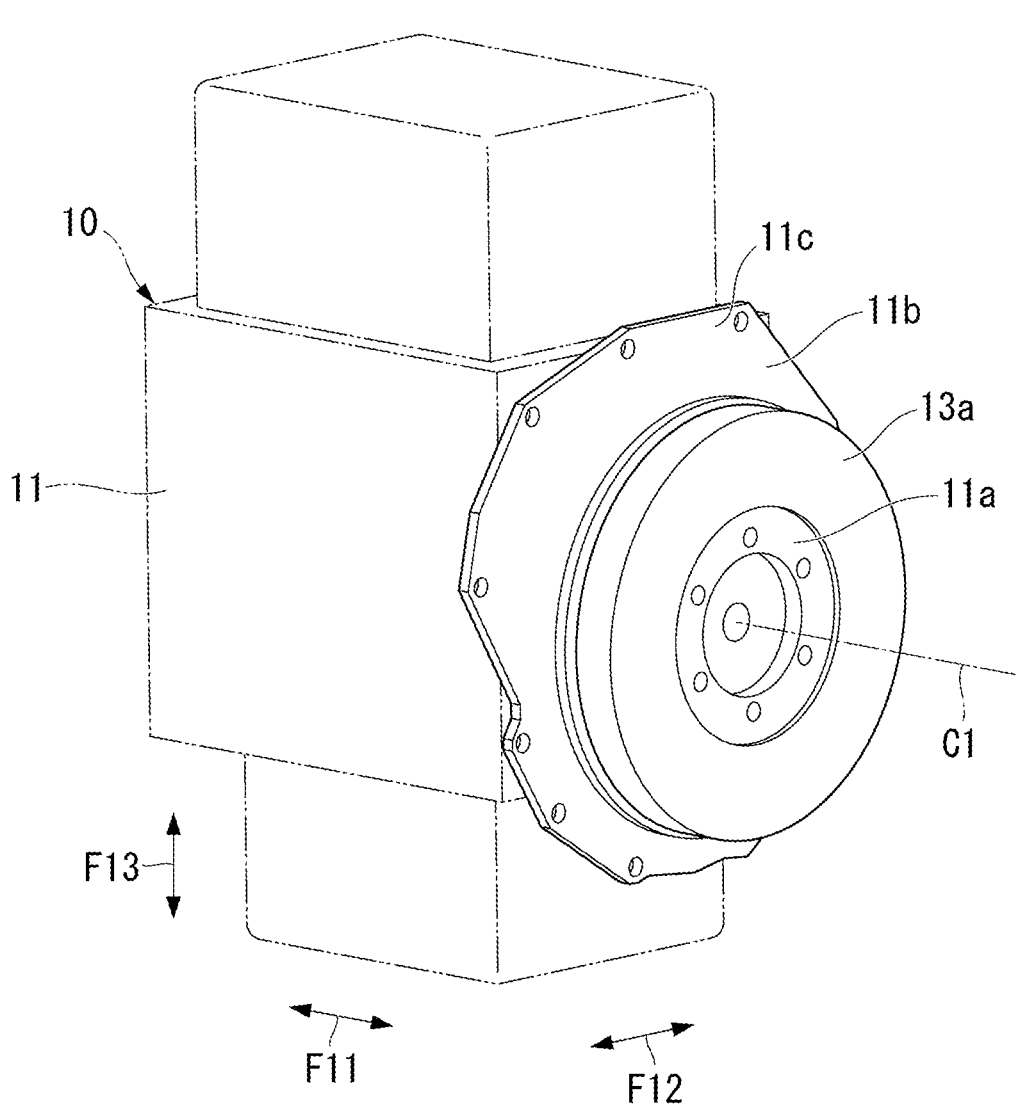
FIG. 6 is a perspective view of a portion for coupling the transmission unit in the engine.
Figure 7:
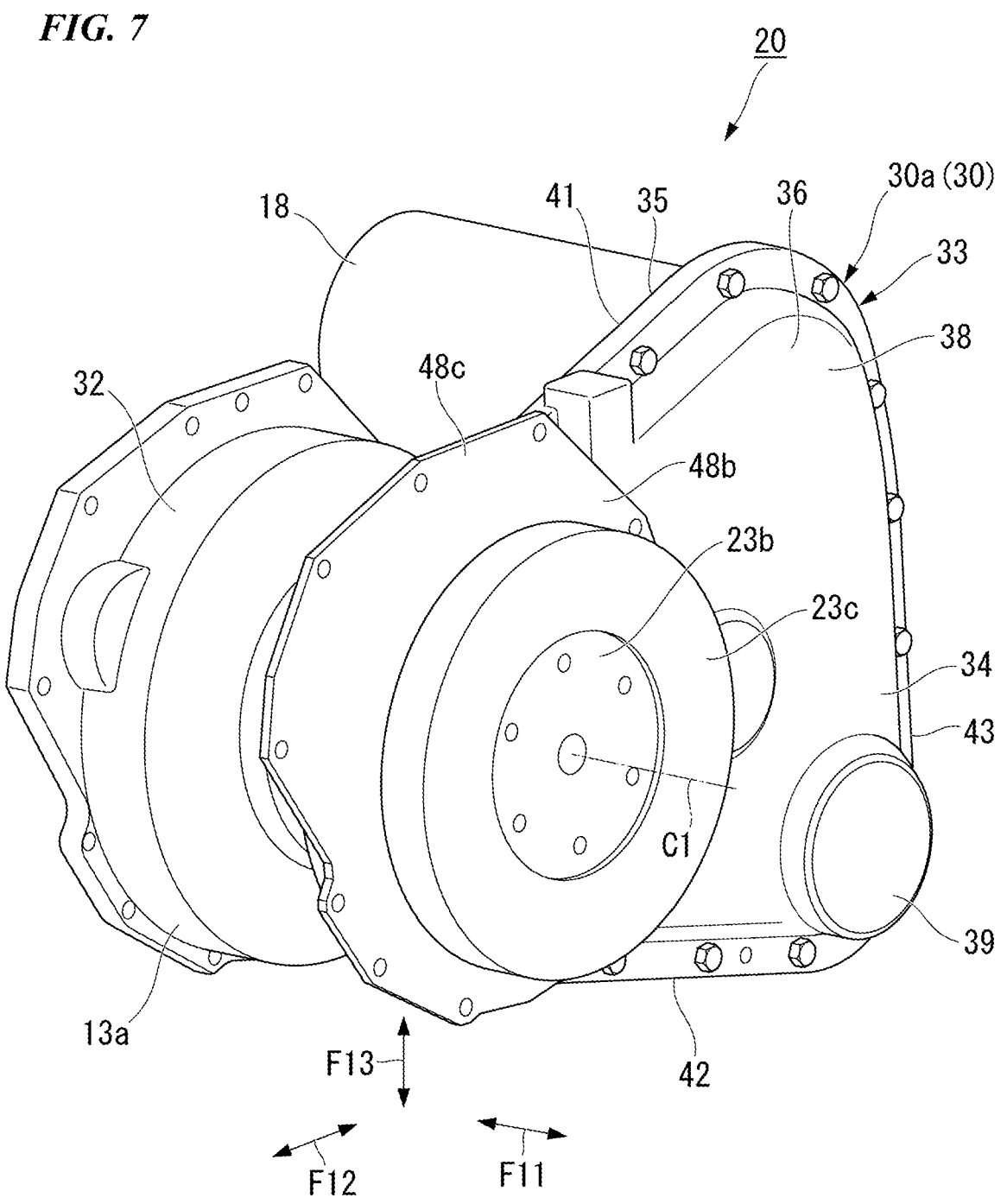
FIG. 7 is a perspective view of a portion for coupling the hydraulic pump in the transmission unit.
Figure 8:
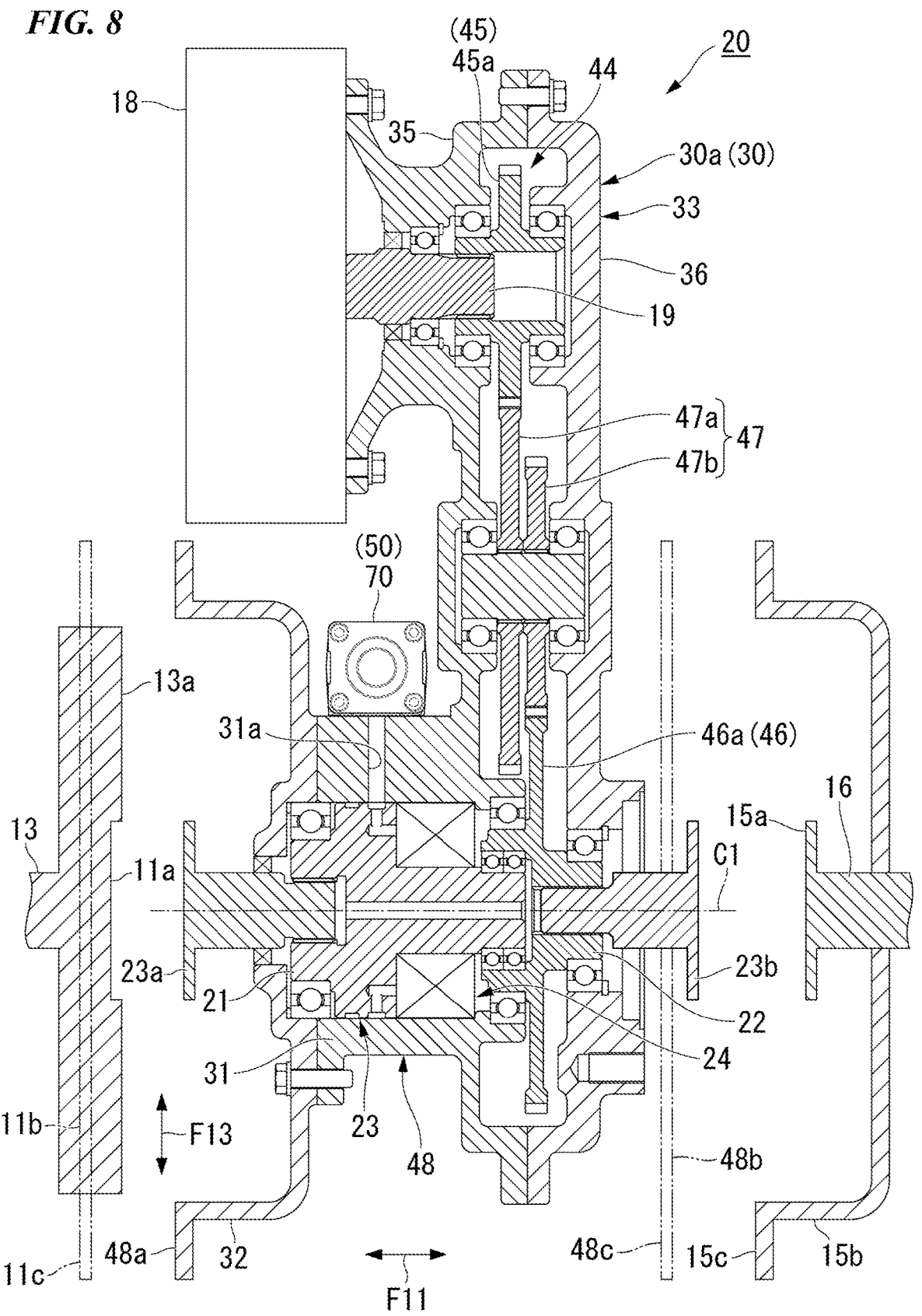
FIG. 8 is a cross-sectional view corresponding to FIG. 5, and is an explanatory view showing a coupling structure between the transmission unit, the engine, and the hydraulic pump.

Hereinafter, a coupling structure of the engine 10, the clutch unit 20, and the hydraulic pump 15 according to a second embodiment of the present invention will be described with reference to FIGS. 6 to 8. For convenience of illustration, there are some differences between the configurations in FIGS. 1 to 5 and the configurations in FIGS. 6 to 8.

The flywheel 13a is provided in an outer side end portion of the output shaft 13 of the engine 10 in the axial direction. A first coupling portion 11a is provided in an outer side portion of the flywheel 13a in the axial direction.

The first coupling portion 11a is a coupling portion for coupling a counterpart (for example, the input shaft 16) to which the driving force is transmitted from the output shaft 13 to the output shaft 13.

A second coupling portion 15a that can be coupled to the first coupling portion 11a is provided on an outer side of the input portion 16 of the hydraulic pump 15 in the axial direction. The second coupling portion 15a is a coupling portion for coupling, to the input shaft 16, a counterpart (for example, the output shaft 13) that transmits the driving force to the input shaft 16.

The output shaft 13 of the engine 10 and the input shaft 16 of the hydraulic pump 15 can be directly coupled by the first and second coupling portions 11a and 15a. The first and second coupling portions 11a and 15a are detachably joined by using fasteners, such as a plurality of bolts and nuts. The power transmission is enabled between the input and output shafts 13 and 16 by coupling the first and second coupling portions 11a and 15a.

In the present embodiment, the coupling element 23 of the clutch unit 20 is inserted between the first and second coupling portions 11a and 15a. The first and second coupling portions 11a and 15a are indirectly coupled via the coupling element 23. The coupling makes it possible to transmit the rotational power between the input and output shafts 13 and 16 via the coupling element 23.

A driving-side coupling portion 23*a* that can be coupled to the first coupling portion 11*a* of the flywheel 13*a* is provided in one end portion of the coupling element 23 in the axial direction (outer side end portion of the first coupling shaft 21 positioned on the engine 10 side). For example, the driving-side coupling portion 23*a* has the same shape as the second coupling portion 15*a* of the input shaft 16. The first coupling portion 11*a* and the driving-side coupling portion 23*a* are detachably joined by using fasteners, such as a plurality of bolts and nuts. As shown in FIG. 8, the first coupling shaft 21 may be configured by a plurality of components that are spline-fitted together.

A driven-side coupling portion 23*b* that can be coupled to the second coupling portion 15*a* of the input shaft 16 is provided in the other end portion of the coupling element 23 in the axial direction (outer side end portion of the second coupling shaft 22 positioned on the hydraulic pump 15 side). For example, the driven-side coupling portion 23*b* has the same shape as the first coupling portion 11*a* of the flywheel 13*a*. The second coupling portion 15*a* and the driven-side coupling portion 23*b* are detachably joined by using fasteners, such as a plurality of bolts and nuts. As shown in FIG. 8, the second coupling shaft 22 may be configured by a plurality of components that are spline-fitted together. As shown in FIG. 7, a wheel portion 23*c* similar to the flywheel 13*a* may be provided around the driven-side coupling portion 23*b*.

Each of the coupling portions 23*a* and 23*b* of the coupling element 23 inserted between the first and second coupling portions 11*a* and 15*a* has the following configuration. That is, the driving-side coupling portion 23*a* coupled to the first coupling portion 11*a* in the coupling element 23 has the same shape as the second coupling portion 15*a*, and the driven-side coupling portion 23*b* coupled to the second coupling portion 15*a* in the coupling element 23 has the same shape as the first coupling portion 11*a*.

As a result, it is easy to design the coupling structure between the coupling element 23 and the input and output shafts 13 and 16, and it is also easy to facilitate the coupling work between the coupling element 23, and the input and output shafts 13 and 16. It should be noted that each of the coupling portions 23*a* and 23*b* is not limited to the same shape described above. Each of the coupling portions 23*a* and 23*b* only needs to have a configuration coupled to the first and second coupling portions 11*a* and 15*a* in a power transmission enabled manner.

A driving-side case coupling portion 48*a* is provided in one end portion of the coupling case portion 48 that accommodates the coupling element 23 in the axial direction (outer peripheral portion of an open end on the engine 10 side of the wheel housing 32).

The driving-side case coupling portion 48*a* has an aspect as a flange extending around an outer periphery of the open end of the wheel housing 32.

The first body coupling portion 11*c* is provided around the first coupling portion 11*a* of the output shaft 13 on an outer side surface of the body (for example, the crankcase 11) of the engine 10. The first body coupling portion 11*c* is provided on an outer peripheral portion of a closing plate 11*b* that intersects with the axial direction. The first body coupling portion 11*c* and the driving-side case coupling portion 48*a* are detachably joined by using fasteners, such as a plurality of bolts and nuts.

A housing 15*b* similar to the wheel housing 32 is provided around the second coupling portion 15*a* of the input portion

16 in the body (pump body) of the hydraulic pump 15. In a case in which the hydraulic pump 15 is directly coupled to the engine 10, the housing 15*b* accommodates the flywheel 13*a* inside. A second body coupling portion is provided in an outer peripheral portion of an open end on the engine 10 side of the housing 15*b*. The second body coupling portion 15*c* has an aspect as a flange extending around an outer periphery of the open end of the housing 15*b*. For example, the second body coupling portion 15*c* has the same shape as the driving-side case coupling portion 48*a* of the coupling case portion 48.

A driven-side case coupling portion 48*c* is provided in the other end portion of the coupling case portion 48 in the axial direction (end portion on the hydraulic pump 15 side). A closing plate 48*b* similar to the closing plate 11*b* of the engine 10 is provided in the other end portion of the coupling case portion 48 in the axial direction. The driven-side case coupling portion 48*c* is provided in an outer peripheral portion of the closing plate 48*b*. The driven-side case coupling portion 48*c* and the second body coupling portion 15*c* are detachably joined by using fasteners, such as a plurality of bolts and nuts. For example, the driven-side case coupling portion 48*c* has the same shape as the first body coupling portion 11*c* of the engine 10.

The first body coupling portion 11*c* of the engine 10 and the second body coupling portion 15*c* of the hydraulic pump 15 can be directly coupled. In the present embodiment, the coupling case portion 48 of the clutch unit 20 is inserted between the first and second body coupling portions 11*c* and 15*c*. The first and second body coupling portions 11*c* and 15*c* are indirectly coupled via the coupling case portion 48.

Each of the coupling portions 48*a* and 48*c* of the coupling case portion 48 has the following configuration. That is, in the coupling case portion 48, the driving-side case coupling portion 48*a* coupled to the first body coupling portion 11*c* of the engine 10 has the same shape as the second body coupling portion 15*c* of the hydraulic pump 15, and the driven-side case coupling portion 48*c* coupled to the second body coupling portion 15*c* of the hydraulic pump 15 has the same shape as the first body coupling portion 11*c* of the engine 10.

As a result, it is easy to design the coupling structure between the coupling case portion 48 and the bodies of the engine 10 and the hydraulic pump 15, and it is also easy to facilitate the coupling work between the coupling case portion 48, and the engine 10 and the hydraulic pump 15. It should be noted that each of the coupling portions 48*a* and 48*c* is not limited to the same shape described above. Each of the coupling portions 48*a* and 48*c* only need to have a configuration coupled integrally with the first and second body coupling portions 11*c* and 15*c*.

As described above, the clutch unit 20 having the coupling structure includes the coupling element 23 that couples, in a power transmission enabled manner, the output shaft 13 of the engine 10 and the input shaft 16 of the hydraulic pump 15 driven by the driving force of the engine 10, and the motor generator 18 that generates the driving force separately from the engine 10, in which the coupling element 23 includes the driving-side coupling portion 23*a* which is coupled to the first coupling portion 11*a* that is provided in the output shaft 13, and the driven-side coupling portion 23*b* which is coupled to a second coupling portion 15*a* that is provided in the input shaft 16 and that can be coupled to the first coupling portion 11*a*.

The power system 1 according to the embodiment includes the clutch unit 20, the engine 10, and the hydraulic pump 15.

With this configuration, in a case in which the clutch unit 20 including the motor generator 18 is installed between the engine 10 and the hydraulic pump 15, it is possible to install the clutch unit 20 without changing each of the coupling portions that can be coupled to each other in the engine 10 and the hydraulic pump 15 or without disposing a separate component between the clutch unit 20 and engine 10 or between the clutch unit 20 and the hydraulic pump 15. As a result, it is possible to install the clutch unit 20 by using the coupling portions of the engine 10 and the hydraulic pump 15, and it is possible to efficiently hybridize the existing power system.

In the clutch unit 20, the driven-side coupling portion 23b has the same shape as the first coupling portion 11a.

With this configuration, since the driven-side coupling portion 23b of the clutch unit 20 has the same shape as the first coupling portion 11a of the engine 10, it is possible to install the clutch unit 20 without changing the second coupling portion 15a of the hydraulic pump 15 or disposing a separate component between the clutch unit 20 and the hydraulic pump 15. As a result, it is possible to efficiently hybridize the existing power system.

The clutch unit 20 includes the coupling case portion 48 that accommodates the coupling element 23, in which the coupling case portion 48 includes the driving-side case coupling portion 48a which is coupled to the first body coupling portion 11c that is provided in the body of the engine 10, and the driven-side case coupling portion 48c which is coupled to the second body coupling portion 15c that is provided in the body of the hydraulic pump 15 and that can be coupled to the first body coupling portion 11c.

With this configuration, it is possible to couple the coupling case portion 48 of the clutch unit 20 without changing each of the body coupling portions 11c and 15c of the engine 10 and the hydraulic pump 15 or disposing a separate component between the clutch unit 20 and the engine 10 or between the clutch unit 20 and the hydraulic pump 15. As a result, it is possible to efficiently hybridize the existing power system.

In the clutch unit 20, the driven-side case coupling portion 48c has the same shape as the first body coupling portion 11c.

With this configuration, since the driven-side case coupling portion 48c of the clutch unit 20 has the same shape as the first body coupling portion 11c of the engine 10, it is possible to install the clutch unit 20 without changing the second body coupling portion 15c of the hydraulic pump 15 or disposing a separate component between the clutch unit 20 and the hydraulic pump 15. As a result, it is possible to efficiently hybridize the existing power system.

In the clutch unit 20, the coupling element 23 includes the clutch 24 that connects or disconnects the power transmission between the engine 10 and the hydraulic pump 15, and the motor generator 18 is coupled to the engine 10 via the clutch 24 in a power transmission enabled manner, and is coupled to the hydraulic pump 15 without passing through the clutch 24 in a power transmission enabled manner.

With this configuration, in a case in which the clutch 24 is in the connected state, the engine 10 can drive the hydraulic pump 15 and drive the motor generator 18 to generate the power.

In this case, in a case in which the powering operation of the motor generator 18 is performed, the motor generator 18 can assist the driving of the engine 10. In addition, in a case in which the powering operation of the motor generator 18 is performed with the clutch 24 which is in the disconnected state, the hydraulic pump 15 can be driven only by the motor generator 18 while the engine 10 is stopped.

It should be noted that the present invention is not limited to the embodiment described above, and for example, the driving source is not limited to the engine 10 (internal combustion engine) and may be an electric motor. The clutch 24 may be of a normally closed type that is in the disconnected state by the supply of the hydraulic pressure instead of the normally open type that is in the connected state by the supply of the hydraulic pressure. The transmission device is not limited to the clutch 24 that connects or disconnects the power transmission, and may be a clutch that controls a gear shift operation of a transmission. In addition, the transmission device may be a transmission that performs gear shift operation by the supply of the hydraulic pressure.

The configuration in the embodiment described above is an exemplary example of the present invention, and various modifications are possible without departing from the scope of the present invention, such as replacing the constituent elements of the embodiment described above with known constituent elements.

INDUSTRIAL APPLICABILITY

With the transmission unit according to the aspect of the present invention, the second driving source is disposed to be offset from the coupling element of the driving source and the driven device, so that it is possible to further suppress the increase in the widths of the transmission unit and the power system including the transmission unit in the axial direction as compared with a case in which the second driving source is disposed coaxially with the driving source.

In addition, as compared with a case in which the second driving source is interposed between the output shaft of the driving source and the input shaft of the driven device, it is easier to access the second driving source from the outside and it is possible to further improve the maintainability.

REFERENCE SIGNS LIST

1: power system
10: engine (driving source)
13: output shaft
13a: flywheel (rotor)
15: hydraulic pump (driven device)
16: input portion (input shaft)
18: motor generator (second driving source)
19: motor output shaft (second output shaft)
23: coupling element
24: clutch
30: transmission case
32: wheel housing (rotor housing)
33: flat-shaped case portion
44: transmission mechanism
F11: axial direction
F12: width direction (orthogonal direction)
F13: up-down direction (orthogonal direction)

The invention claimed is:
1. A transmission unit comprising:
a coupling including a clutch configured to, in a power transmission enabled manner, couple an output shaft of a driving source and an input shaft of a driven device driven by driving force of the driving source; and
a second driving source configured to generate driving force separately from the driving source, wherein the second driving source is disposed to avoid the coupling as viewed from an axial direction of the output shaft, the second driving source is a motor generator and includes a second output shaft that is offset with respect to the output shaft, a transmission gear train configured to accelerate driving force of the output shaft and transmit the accelerated driving force to the second output shaft is provided between the output shaft and the second output shaft, between the output shaft and the second output shaft, the transmission gear train configured to transmit power is provided, and a transmission case configured to accommodate the transmission gear train is also provided, a rotor housing configured to accommodate a rotor configured to rotate integrally with the output shaft is provided in a portion on a driving source side of the transmission case in the axial direction, and the second driving source is provided side by side with the rotor housing on a same plane when viewed in the axial direction to avoid the rotor housing at the portion on the driving source side of the transmission case.

2. The transmission unit according to claim 1, wherein the transmission case includes a cylindrical-shaped case portion that has a cylindrical shape and accommodates the output shaft and the coupling coaxial with the output shaft and a flat-shaped case portion that is formed into a flat shape with a width in the axial direction narrower than each width in a width direction and an up-down direction of the flat-shaped case portion and that is disposed on a driven device side of the cylindrical-shaped case portion.

3. The transmission unit according to claim 2, wherein the clutch is a hydraulic clutch that connects or disconnects a power transmission between the driving source and the driven device, an oil supply controller configured to control a supply of a hydraulic oil to the hydraulic clutch is disposed on a driving source side of the flat-shaped case portion.

4. The transmission unit according to claim 2 wherein the second driving source is a motor generator and is coupled to the driving source via the clutch in a power transmission enabled manner, and the second driving source is coupled to the driven device without passing through the clutch in a power transmission enabled manner.

5. A power system comprising:

the transmission unit according to claim 4;

the driving source; and the driven device.

6. The transmission unit according to claim 3, wherein the second driving source is a motor generator and is coupled to the driving source via the hydraulic clutch in a power transmission enabled manner, and the second driving source is coupled to the driven device without passing through the hydraulic clutch in a power transmission enabled manner.

7. A power system comprising:

the transmission unit according to claim 6;

the driving source; and the driven device.

8. A power system comprising:

the transmission unit according to claim 2;

the driving source; and the driven device.

9. A power system comprising:

the transmission unit according to claim 3;

the driving source; and the driven device.

10. The transmission unit according to claim 1, wherein the second driving source is a motor generator and is coupled to the driving source via the clutch in a power transmission enabled manner, and the second driving source is coupled to the driven device without passing through the clutch in a power transmission enabled manner.

11. A power system comprising:

the transmission unit according to claim 10;

the driving source; and the driven device.

12. A power system comprising:

the transmission unit according to claim 1;

the driving source; and the driven device.

* * * * *